United States Patent

Janzen et al.

Patent Number: 6,141,614
Date of Patent: Oct. 31, 2000

[54] COMPUTER-AIDED FARMING SYSTEM AND METHOD

[75] Inventors: David C. Janzen, Metamora; Louis G. Alster, Morton, both of Ill.

[73] Assignee: Caterpillar Inc., Peoria, Ill.

[21] Appl. No.: 09/116,618

[22] Filed: Jul. 16, 1998

[51] Int. Cl.⁷ .............................. G06F 7/70; G06G 7/76
[52] U.S. Cl. ...................... 701/50; 701/208; 701/213; 172/2; 172/4.5; 700/83
[58] Field of Search .......................... 701/50, 207, 208, 701/213, 300; 342/357.13, 357.17, 457; 340/988, 995, 438, 684, 685; 172/2, 4, 4.5, 7, 9; 56/10.2 F, 10.2 A; 37/348, 414; 700/66, 83, 59

[56] References Cited

U.S. PATENT DOCUMENTS

| | | | |
|---|---|---|---|
| 4,173,260 | 11/1979 | van der Lely et al. | 172/59 |
| 4,408,195 | 10/1983 | Tullis et al. | 340/685 |
| 4,630,685 | 12/1986 | Huck, Jr. et al. | 701/50 |
| 5,050,771 | 9/1991 | Hanson et al. | 222/1 |
| 5,260,875 | 11/1993 | Tofte et al. | 364/424.07 |
| 5,323,721 | 6/1994 | Tofte et al. | 111/200 |
| 5,355,815 | 10/1994 | Monson | 111/200 |
| 5,438,817 | 8/1995 | Nakamura | 56/10.2 A |
| 5,453,924 | 9/1995 | Monson et al. | 364/131 |
| 5,467,271 | 11/1995 | Abel et al. | 364/420 |
| 5,526,002 | 6/1996 | Gudat et al. | 342/457 |
| 5,612,864 | 3/1997 | Henderson | 701/50 |
| 5,646,844 | 7/1997 | Gudat et al. | 701/50 |
| 5,646,846 | 7/1997 | Bruce et al. | 364/424.07 |
| 5,648,901 | 7/1997 | Gudat et al. | 701/50 |
| 5,651,500 | 7/1997 | Patterson et al. | 239/69 |
| 5,668,719 | 9/1997 | Bobrov et al. | 364/420 |
| 5,673,637 | 10/1997 | Colburn, Jr. et al. | 111/118 |
| 5,684,476 | 11/1997 | Anderson | 340/988 |
| 5,689,418 | 11/1997 | Monson | 364/420 |
| 5,712,782 | 1/1998 | Weigelt et al. | 701/50 |
| 5,721,679 | 2/1998 | Monson | 701/50 |
| 5,735,352 | 4/1998 | Henderson et al. | 172/4.5 |
| 5,751,576 | 5/1998 | Monson | 364/188 |
| 5,754,137 | 5/1998 | Durrstein | 342/357 |
| 5,764,511 | 6/1998 | Henderson | 701/50 |
| 5,771,169 | 6/1998 | Wendte | 364/420 |
| 5,935,192 | 8/1999 | Henderson et al. | 701/208 |
| 5,978,720 | 11/1999 | Hieronymus et al. | 701/50 |

FOREIGN PATENT DOCUMENTS

| | | |
|---|---|---|
| 0576121 A1 | 12/1993 | European Pat. Off. . |
| 0821296 A2 | 1/1998 | European Pat. Off. . |
| WO98/21930 | 5/1998 | WIPO . |

OTHER PUBLICATIONS

Industrial Robot article: Automating Agricultural Vehicles; vol. 24 No. 5–1997 pp. 364–369.

IVT'97 International Off–Highway; Published UK & International Press ISSN 1355–2627—Robotics in the Field.

Navigation: Journal of the Institute of Navigation vol. 43, No. 2 Carrier–Phase DGPS for Closed–Loop Control of Farm & Construction Vehic.

*Primary Examiner*—Jacques H. Louis-Jacques
*Attorney, Agent, or Firm*—Steve D. Lundquist

[57] ABSTRACT

A computer-aided farming system having a first control system which receives data defining a plurality of parameters. The first control system responsively determines a plurality of nodes located at an agricultural field, and determines a condition status associated with each node. The system also has a second control system located on an agricultural machine which receives data defining the nodes and the condition status at each node. The second control system then plans a path as a function of the nodes, and determines a desired work operation relative to each node. A machine controller controls the agricultural machine to perform the desired work operation at each node.

50 Claims, 6 Drawing Sheets

Fig. 1.
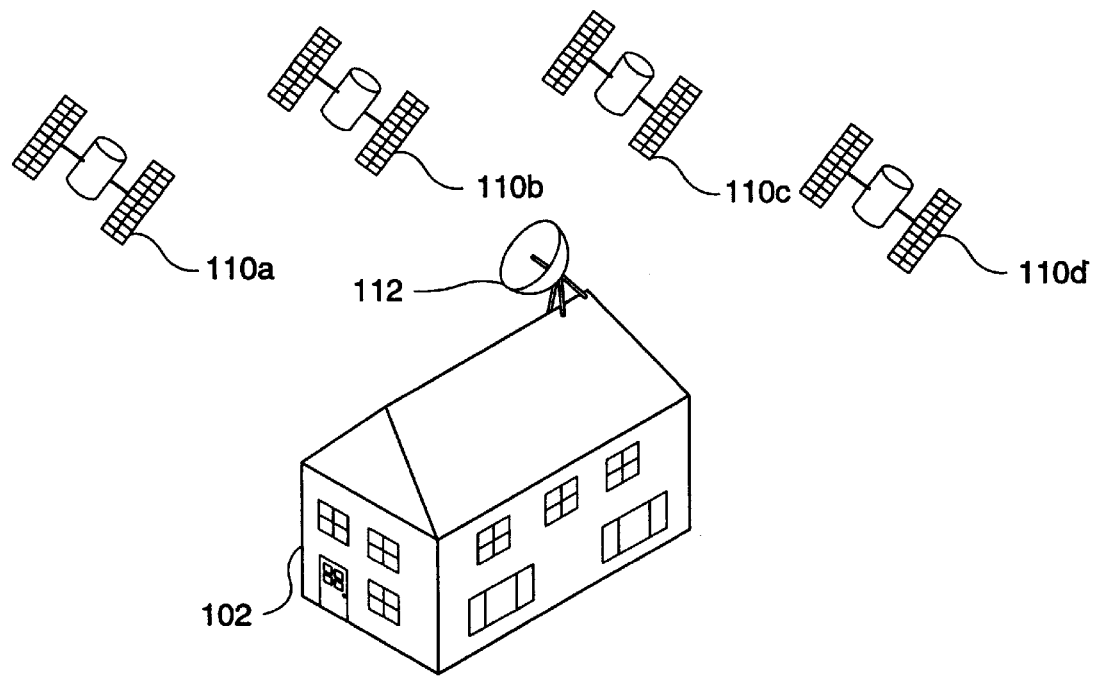
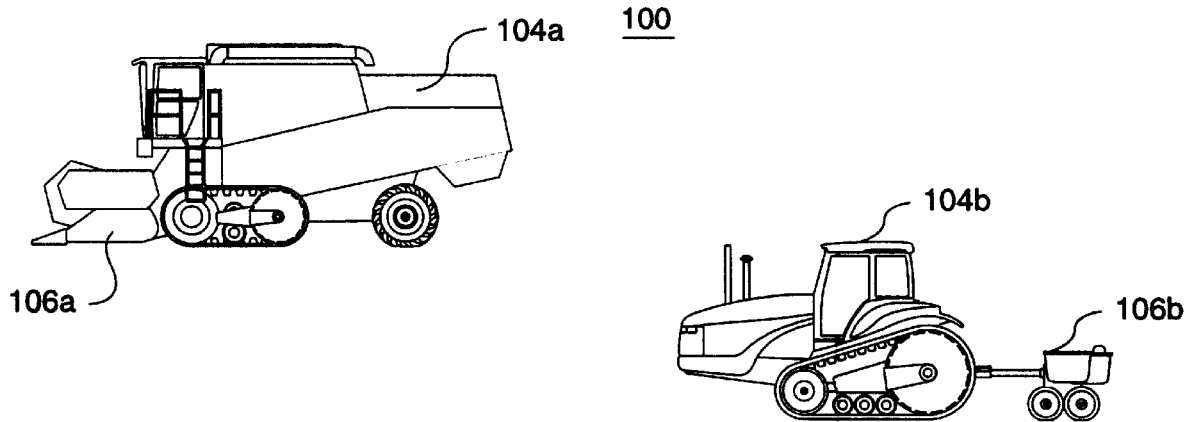
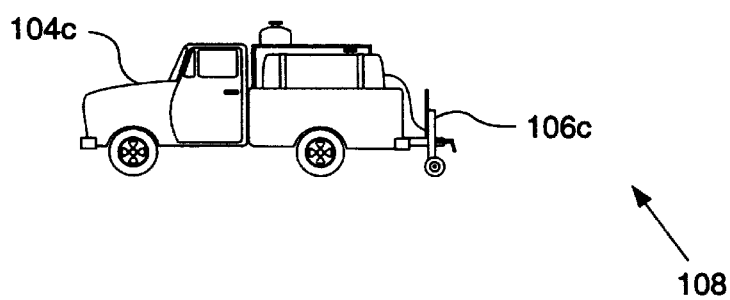

Fig_2_

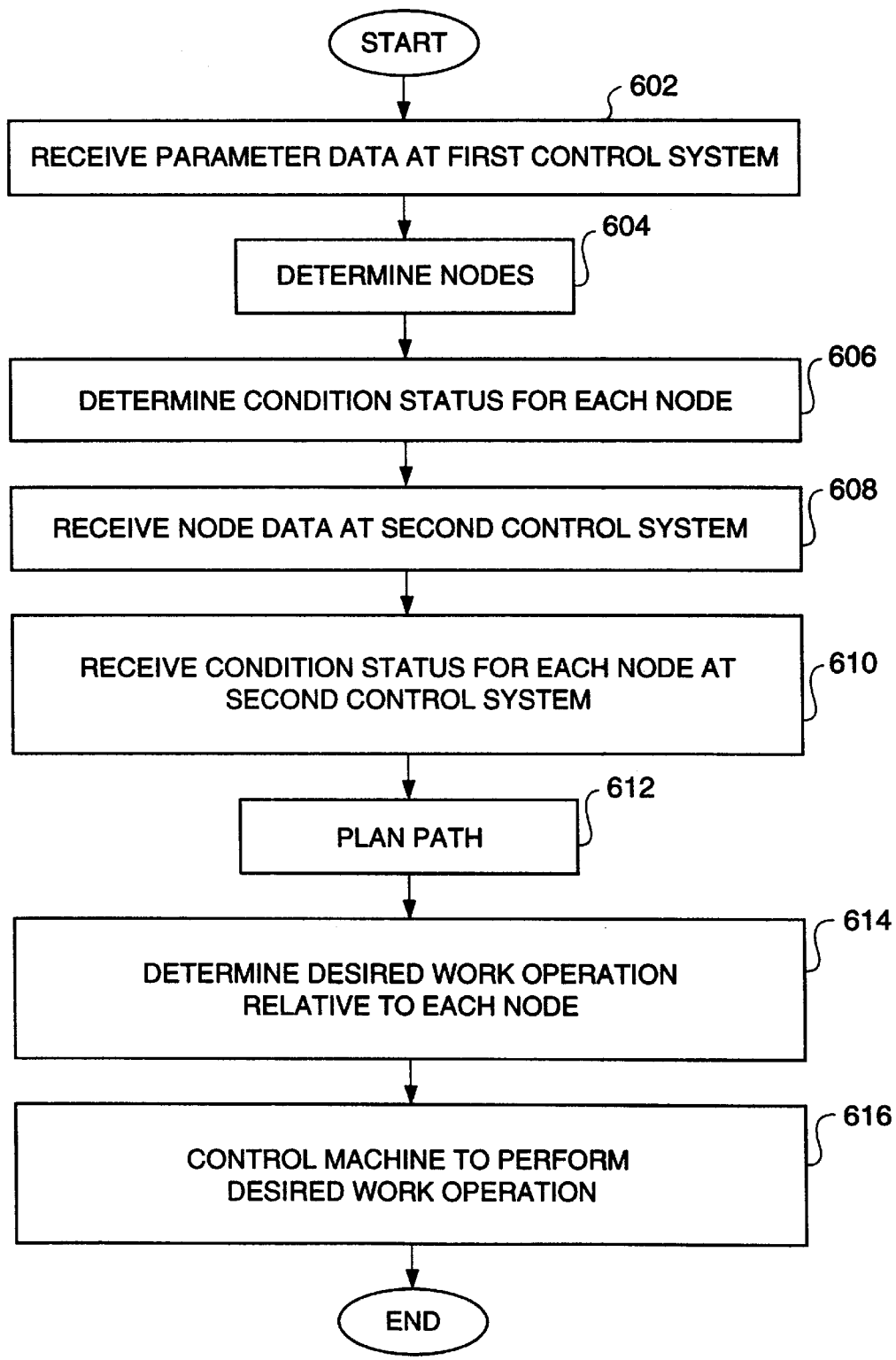

COMPUTER-AIDED FARMING SYSTEM AND METHOD

TECHNICAL FIELD

This invention relates generally to a system for controlling an agricultural machine and, more particularly, to a system for selectively controlling an agricultural machine as a function of a plurality of predetermined nodes located at an agricultural work site.

BACKGROUND ART

It has long been a desire in agricultural operations to reduce costs and increase efficiency and productivity by performing only those tasks that are needed at specific locations. For example, an agricultural field may require an application of fertilizer or chemicals, but only on certain areas of the field. The conventional method of applying the chemicals over the entire field results in unnecessary costs. In addition, current environmental concerns make excess chemical applications undesirable.

In U.S. Pat. No. 5,050,771, Hanson et al. discloses a control system in which a field may be sprayed selectively, based on a map showing areas where application is desired. An agricultural machine uses sensors to track the distance the machine travels. Checkpoints and flags provide a machine operator with means to determine position relative to the areas for application. Hanson et al. offers a method to selectively control the locations to apply chemicals in a field. However, the method requires the placement of flags and markers to give an operator a set of references. Placing these flags requires considerable effort, and results in a system that is low in accuracy and reliability. In addition, the locations for spraying must be stored in a memory. Any desired changes would require reprogramming the existing memory locations.

Recent advances in technologies, such as Global Positioning Satellite (GPS) systems and computer technologies, have paved the way for developments commonly known as precision farming. By knowing the location of an agricultural machine relative to a known terrain map, navigation of the machine can be controlled. Also, the tasks performed by the machine can be controlled in selective areas.

As an example of precision farming, Anderson, in U.S. Pat. No. 5,684,476, discloses a navigation system for an agricultural machine which uses GPS and dead reckoning technology to determine the location of the machine and correct for determined navigation errors. Anderson also discloses the use of a terrain map and checkpoints to aid in navigating the machine. However, the checkpoints are determined based on sensed operations of the machine. For example, when the GPS system determines that the machine has changed direction, a checkpoint indicating a boundary of the field is determined. Other checkpoints are determined based on sensed elevation changes, sudden turns, and the like. The system which Anderson discloses does not provide checkpoints in advance for path planning and implement control. In addition, Anderson does not provide for a central control system which provides data and checkpoints to allow multiple agricultural machines to cooperatively work in a field, providing the same or different operations.

In U.S. Pat. No. 5,712,782, Weigelt et al. discloses a method for multiple agricultural machines to communicate with a central controller. Each machine is equipped with an on-board processor to control the machine to some extent. However, Weigelt et al. does not disclose path planning or implement control by the machine processors.

The present invention is directed to overcoming one or more of the problems as set forth above.

DISCLOSURE OF THE INVENTION

In one aspect of the present invention a computer-aided farming system is disclosed. The system includes a first control system to receive data defining a plurality of parameters, determine a plurality of nodes located at an agricultural field, and determine a condition status associated with each node. The system also includes a second control system located on an agricultural machine to receive data defining the nodes and the condition status at each node, plan a path as a function of the nodes, and determine a desired work operation relative to each node. The system further includes a machine controller to control the agricultural machine to perform the desired work operation at each node.

In another aspect of the present invention a computer-aided farming method is disclosed. The method includes the steps of receiving parameter data at a first control system, determining a plurality of nodes at an agricultural field, and determining a condition status associated with each node. The method also includes the steps of receiving data defining the nodes and the condition status at each node at a second control system, planning a path as a function of the nodes, and determining a desired work operation relative to each node. The method further includes the step of controlling the agricultural machine to perform the desired work operation at each node.

BRIEF DESCRIPTION OF THE DRAWINGS

FIG. 1 is a diagrammatic illustration of an embodiment of the present invention;

FIG. 6 is a flow diagram illustrating a method of the present invention.

BEST MODE FOR CARRYING OUT THE INVENTION

Figure 2:
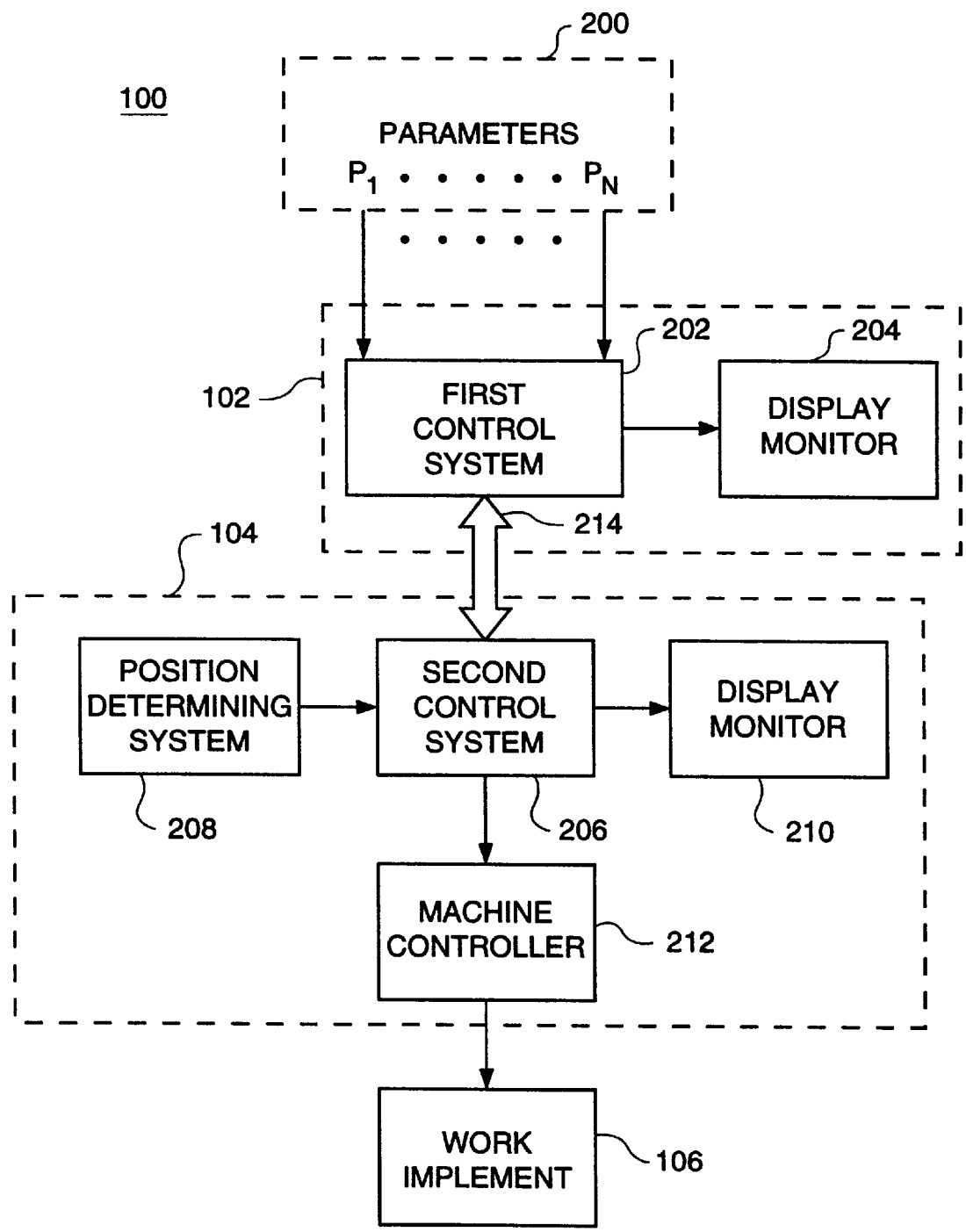
FIG. 2 is a block diagram illustrating an embodiment of the present invention.

Referring to the drawings, and with particular reference to FIG. 1, a diagrammatic illustration of a computer-aided farming system 100 is shown.

A base station 102 provides a central location for the computer-aided farming system 100. The base station 102 may be located near an agricultural field 108, or may be at a remote location, such as, for example, in a large farming operation consisting of multiple fields over a large geographic area. The base station 102 is shown with a base station GPS antenna 112, adapted to receive signals from a plurality of GPS satellites 110, four of which are shown in FIG. 1 and depicted as 110a,b,c,d. However, it is understood by common knowledge in the art that more than four GPS satellites 110 exist and any number greater than or less than four GPS satellites 110 may be in range of the base station GPS antenna 112 at any given time.

The base station GPS antenna 112 functions as a differential GPS antenna (DGPS) in the computer-aided farming system 100. The base station GPS antenna 112 is shown located at the base station 102. However, the base station GPS antenna 112 may be positioned at any known, stationary location that provides signal coverage over the agricultural field 108. Differential GPS technology is well known in the art and will not be discussed further.

Located in the agricultural field 108 is at least one agricultural machine 104. As shown in FIG. 1, an agricultural machine 104 may be a harvester machine 104a, a tractor 104b, a truck 104c, or one of any number of other types of mobile machines used for agricultural applications. Preferably, the agricultural machine 104 includes a work implement 106. For example, a harvester 104a may have a thrasher or crop gathering header 106a, a tractor 104b may have a seed planter, disks, or furrower 106b, and a truck 104c may have a liquid sprayer or granular applicator 106c. Other types of work implements 106 may be attached to the agricultural machine 104 to perform a wide variety of agricultural tasks.

Referring now to FIG. 2, a block diagram of an embodiment of the present invention is shown.

A first control system 202 is shown located at the base station 102. However, the first control system 202 may be located at a site other than the base station 102, such as a remote site or on an agricultural machine 104, without deviating from the spirit of the invention. Preferably, the first control system 202 provides an output to a display monitor 204.

The first control system 202 is adapted to receive a plurality of parameters 200 from a variety of sources. For example, parameters 200 may be received from sensors (not shown) located at the agricultural field 108, from agricultural machines 104, and from agricultural services created to analyze and supply data. Examples of parameters 200 are described below with reference to FIG. 3.

The first control system 202 is further adapted to determine a plurality of nodes located at the agricultural field 108, and to determine a condition status associated with each of the nodes. The condition status at each node is a function of the parameters 200. The nodes and the condition status of each node are discussed in more detail below.

A second control system 206, preferably located on the agricultural machine 104, is adapted to receive data defining the nodes and the condition status at each node from the first control system 202. A communications system 214 provides communications between the first control system 202 and the second control system 206. In the preferred embodiment, the communications system 214 is a wireless communications system. However, in an alternative embodiment, the communications system may be a wired communications system, enabled by electrically connecting the first control system 202 to the second control system 206. As a further alternative embodiment, the communications system may be enabled by use of data receptors at the first and second control systems 202,206, the data receptors being adapted to receive data mediums such as removable storage mediums. Examples of removable storage mediums include, but are not limited to, disks, CD ROMS, tapes, and flash cards.

Other types of communications systems may be used without deviating from the invention.

The second control system 206 is adapted to plan a path as a function of the nodes. Additionally, the second control system 206 is adapted to determine a desired work operation relative to each node as a function of the condition status at each node. Planning a path and determining a desired work operation are discussed in more detail below.

A position determining system 208, located on the agricultural machine 104, is adapted to determine the position of the agricultural machine 104 relative to the agricultural field 108. The position determining system 208 is electrically connected to the second control system 206, and delivers a position signal to the second control system 206. Preferably, the position determining system 208 includes a GPS receiver. However, the position determining system 208 could alternatively use other means for determining position, such as dead reckoning, laser positioning, and the like, or the position determining system 208 could incorporate a combination of position determining methods.

In the preferred embodiment, a display monitor 210, located on the agricultural machine 104, is connected to the second control system 206.

A machine controller 212, located on the agricultural machine 104, is adapted to control the agricultural machine 104 and the work implement 106 to perform the desired work operation at each node. In one embodiment, the machine controller 212 is adapted to control navigation of the agricultural machine 104 to traverse the path. In another embodiment, the machine controller 212 is adapted to control a function of the work implement 106. For example, the machine controller 212 may control a rate of application of a material, such as fertilizers, chemicals, and seeds. As another example, the machine controller 212 may control the position of the work implement 106 relative to the agricultural machine 104, such as an elevation of the work implement 106.

Figure 3:
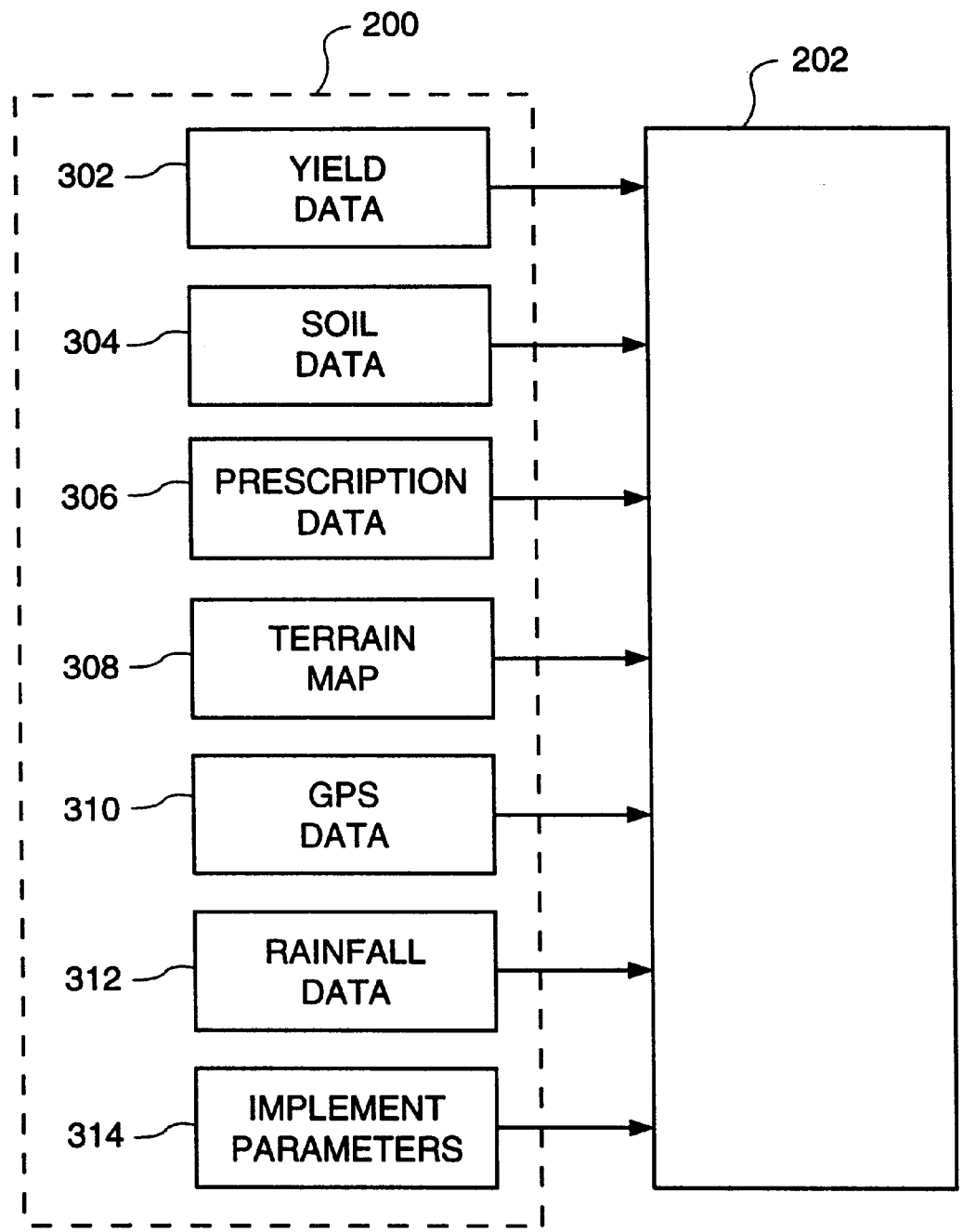
FIG. 3 is a block diagram further illustrating a portion of the embodiment of FIG. 2.

Referring now to FIG. 3, a block diagram illustrating exemplary parameters 200 are shown.

A yield data parameter 302 provides historical data on crop yields on an annual basis. Preferably, yield data is obtained from sensors on the agricultural machine 104 during harvest to associate yield data with locations on the agricultural field 108. By compiling historical yield data, trends in yield production can be determined.

A soil data parameter 304 provides data on soil condition at desired locations throughout the agricultural field 108. Soil data may be obtained from a variety of methods that are known in the art. For example, a GPS equipped agricultural machine 104 may traverse the agricultural field 108 for the express purpose of obtaining soil samples for analysis by a lab. After analysis, the lab would provide the resultant data. As another example, the agricultural machine 104 may be equipped to sample the soil as the machine 104 traverses the field 108 for other purposes. Soil data would then be communicated back to the first control system 202 by the communications system 214.

A prescription data parameter 306 provides data, preferably historical, describing chemical prescriptions that have been added to the agricultural field 108. The data would also include the locations and amounts of the prescriptions added. With the advent of precision farming, the use of prescription chemicals can be monitored with great accuracy, thus providing an historical data base to help determine exactly what chemicals are needed, where they are needed, and how much of each chemical is needed. The prescription data parameter 306 can also be used to monitor the effectiveness of the prescription chemicals.

A terrain map parameter 308 provides terrain map data having characteristics of the agricultural field 108 to the first control system 202. Examples of terrain map data include, but are not limited to, contours of the field 108, obstacles located in the field 108, areas of discontinuous contour in the field 108, e.g., holes, cliff sides, and drop-offs, and areas of non-tillable terrain in the field 108. Terrain map data may be provided by several means including, preferably, terrain-related data being communicated by agricultural machines 104 as they traverse the field 108.

A GPS data parameter 310 includes GPS-related data from the agricultural machines 104 in the field 108. In one embodiment, the first control system 202 monitors the locations of the agricultural machines 104. In another embodiment, the first control system 202 receives data from the machines 104 and associates the data with the locations of the machines 104. For example, an agricultural machine 104 may apply fertilizer at specific locations on the field 108, and the location of the machine 104 during application is determined from the GPS data from the machine 104 at the time of application.

A rainfall data parameter 312 provides historical data pertaining to the amount of rainfall at the agricultural field 108. Rainfall data may be obtained from available weather information sources or may be obtained directly by rainfall sensors installed at strategic locations. In larger agricultural operations, multiple rainfall sensors may provide more accurate information during periods of scattered and intermittent rains.

Implement parameters 314 include information about the work implements 106, such as the type of work an implement 106 performs, the physical dimensions and characteristics of the work implement 106, and historical data which tracks the operation of the work implement 106.

It is to be noted that the above discussed parameters 200 are exemplary of the types of parameters that may be used, and is not an all-inclusive listing. Other parameters may be received by the first control system 202 for use in the present invention.

Figure 4:
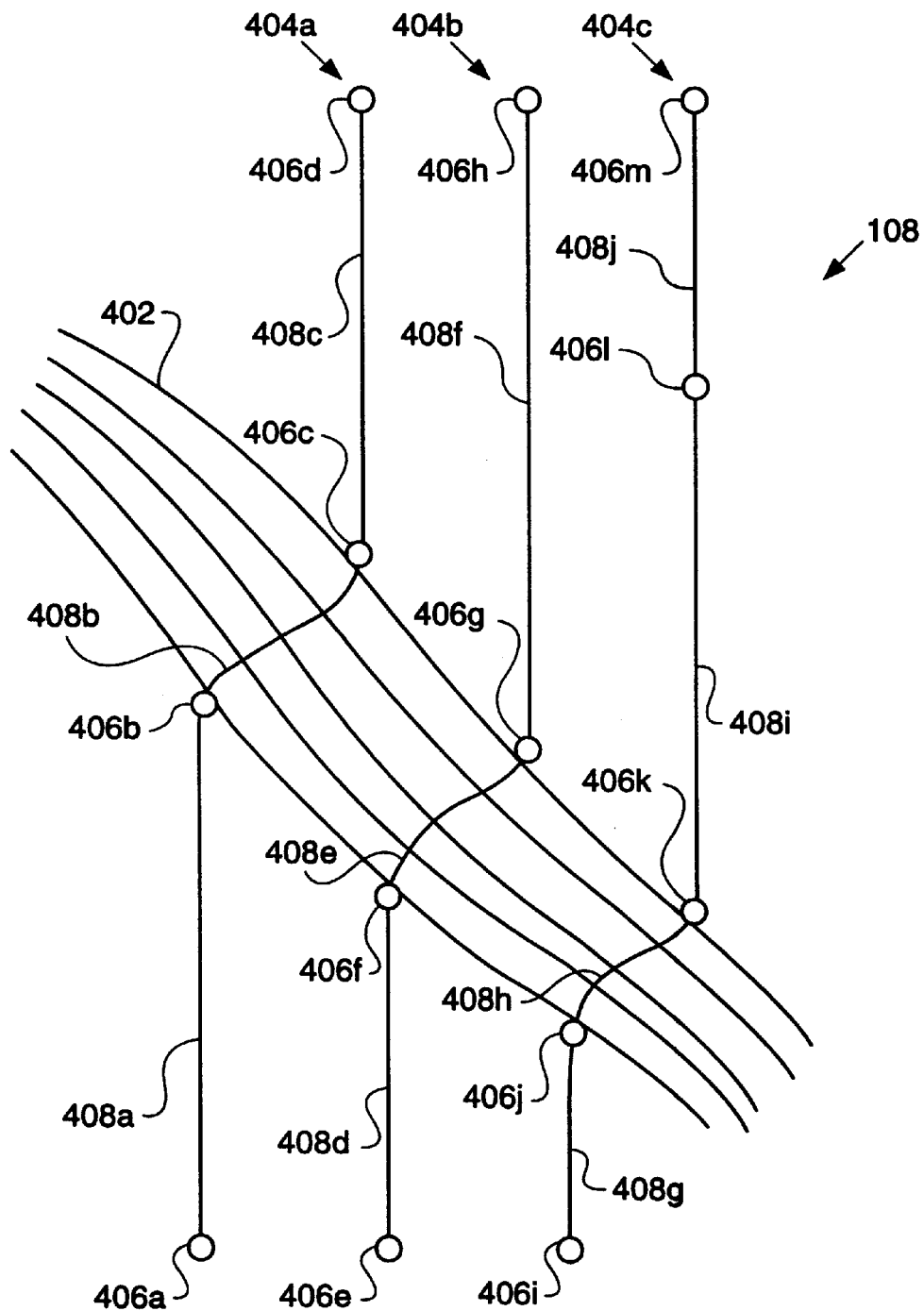
FIG. 4 is a diagrammatic illustration of one aspect of the present invention.

Referring now to FIG. 4, a diagrammatic illustration of one aspect of the present invention is shown. A portion of an agricultural field 108 is illustrated with a series of paths 404a,b,c. The paths 404 are determined by connecting a plurality of nodes 406a–m by a plurality of segments 408a–j. For example, a first path 404a includes nodes 406a,b,c,d, which are connected by segments 408a,b,c. In like manner, a second path 404b includes nodes 406e,f,g,h, which are connected by segments 408d,e,f; and a third path 404c includes nodes 406i,j,k,l,m, which are connected by segments 408g,h,i,j. The paths 404a,b,c are shown approximately parallel with each other. However, adjacent paths may be created non-parallel with each other if desired.

A contour 402 is shown in FIG. 4 to illustrate a situation where it may be desired to alter the direction of movement of the agricultural machine 104. In the example of FIG. 4, it is desired to change the heading of the machine 104 to traverse the contour 402 at essentially right angles to the slope of the contour 402. This change in heading would allow the machine 104 to travel up and down the contour 402 in a manner that would give the machine 104 more control on the sloped surface.

The nodes 406, as discussed above, are determined by the first control system 202. Additionally, the condition status at each node 406 is determined by the first control system 202 as a function of the parameters 200. For example, in FIG. 4, nodes 406b,f,j signify one side of the contour, and nodes 406c,g,k signify the other side of the contour. The condition status for the nodes 406b,c,f,g,j,k indicate a desired change in heading of the agricultural machine 104. In addition, the condition status for nodes 406b,c,f,g,j,k may contain other conditions, e.g., do not plant or plow, vary the rate of a prescription application to a desired rate, alter the depth of till, and the like.

Nodes 406a,e,i and nodes 406d,h,m may indicate, as an example, the start or end of a row in the field 108. Alternatively, nodes 406a,e,i and nodes 406d,h,m may be located within a portion of rows, and may be associated with conditions such as; vary the rate or type of application, do not plow or plant, or change the depth of till to a desired level.

In path 404c, node 406l is located between straight line segments 408i and 408j. Node 406l is not required for path planning, but may have been created to associate with a change in condition status such as; a change in the moisture content in the soil, a change in the prescription chemicals in the soil, the presence of an obstacle, and the like.

Segments 408 are, preferably, created by the second control system 206 during path planning by connecting adjacent nodes. The segments may be created using straight line path planning techniques, as illustrated by segments 408a,c,d,f,g,i,j. Alternatively, the segments may be created using curve fitting techniques, as illustrated by segments 408b,e,h. Path planning using curve fitting techniques are well known in the art. For example, in U.S. Pat. No. 5,648,901, Gudat et al. discloses path planning methods using curve fitting techniques such as b-splines and clothoids.

Figure 5:
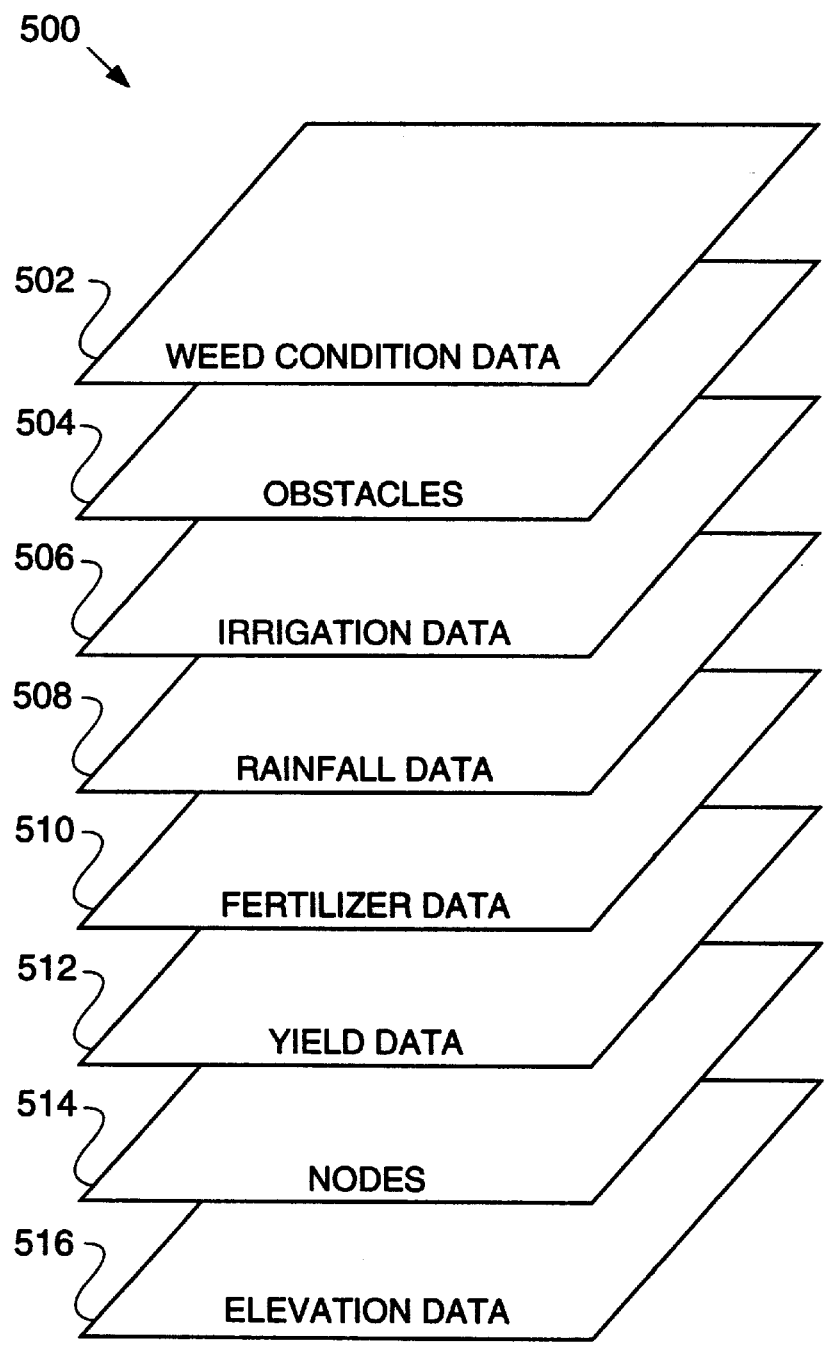
FIG. 5 is a diagrammatic illustration of a layered database map.

Referring now to FIG. 5, a diagrammatic illustration of a preferred embodiment for storing and processing data in the present invention is shown. Data is separated into categories and is shown embodied in a set of layered database maps 500. The layered database maps 500 are preferably based on a terrain map of the agricultural field 108. Each map layer contains a portion of the terrain map characterizing unique features of the field, such as weed condition data 502, obstacles 504, irrigation data 506, rainfall data 508, fertilizer data 510, yield data 512, node locations 514, and elevation data 516. The map layers shown in FIG. 5 are exemplary. Other map layers may be used as well.

In the preferred embodiment, the data in the layered database maps 500 is determined from the parameters 200 that are delivered to the first control system 202, and from updates of the condition status at each node 406 as the agricultural machine 104 performs the desired operations at the nodes 406.

It is noted that the concept of using layered maps to store and process data is well known in the art, and therefore will not be discussed further.

Referring now to FIG. 6, a preferred method of the present invention is shown.

In a first control block 602, data defining a plurality of parameters 200 is received at the first control system 202.

In a second control block 604, a plurality of nodes 406 located at the agricultural field 108 are determined by the first control system 202.

In a third control block 606, the condition status associated with each node 406 is determined. The condition status at each node 406 is determined as a function of the parameters 200.

Control then proceeds to a fourth control block 608 and a fifth control block 610. In the fourth control block 608, data defining the nodes 406 is received by the second control system 206. In the fifth control block 610, data defining the condition status at each node 406 is received by the second control system 206.

In a sixth control block 612, the second control system 206 plans a path as a function of the nodes 406.

In a seventh control block 614, a desired work operation is determined by the second control system 206 relative to each node 406. Preferably, the desired work operation is a function of the condition status at each node 406.

Control then proceeds to an eighth control block 616, where the machine controller 212 controls operation of the agricultural machine 104 and the work implement 106 to perform the desired work operation at each respective node 406.

INDUSTRIAL APPLICABILITY

As an example of an application of the present invention, and with reference to FIG. 1, agricultural machines 104 use a variety of work implements 106 to perform a variety of tasks. As examples, a tractor 104*b* may be used to pull a planter 106*b* to plant seeds. A harvester 104*a* may use a thresher 106*a* to harvest wheat or hay, and a truck 104*c* may use a sprayer 106*c* to spray fertilizer. In each of these examples, the work to be performed may vary over different portions of the agricultural field 108.

The first control system 202 uses data from the parameters 200 received to determine nodes 406 throughout the field 108, each of which is associated with a condition status of that portion of the field 108. Layered database maps 500 containing this information is delivered to a respective second control system 206 located on each agricultural machine 104. Each second control system 206 plans a path for the machine 104, and determines a desired work operation for the machine 104 to perform at each node 406.

In one embodiment of the present invention, the desired work operation is displayed on a display monitor 210 located on the agricultural machine 104 to allow an operator to responsively control the machine 104 and the work implement 106. In another embodiment of the present invention, the desired work operation is communicated to the machine controller 212 to allow autonomous control of the agricultural machine 104 and the work implement 106. In yet another embodiment of the present invention, control of the agricultural machine 104 and the work implement 106 is divided into varying degrees of manual and autonomous control.

Other aspects, objects, and features of the present invention can be obtained from a study of the drawings, the disclosure, and the appended claims.

What is claimed is:

1. A computer-aided farming system, comprising:
   a first control system adapted to receive data defining a plurality of parameters and responsively determine a plurality of nodes located at an agricultural field, the first control system being further adapted to determine a condition status associated with each of the nodes, the condition status at each node being a function of the parameters;
   a second control system located on an agricultural machine and adapted to receive data defining the nodes and the condition status at each node, the second control system being further adapted to plan a path as a function of the nodes and to determine a desired work operation relative to each node, the desired work operation being a function of the condition status at each node; and
   a machine controller located on the agricultural machine and adapted to control the agricultural machine to perform the desired work operation at each respective node.

2. A system, as set forth in claim 1, wherein the path is planned by determining a plurality of segments, each segment connecting two nodes.

3. A system, as set forth in claim 2, wherein the machine controller is adapted to control navigation of the agricultural machine to traverse the path.

4. A system, as set forth in claim 1, wherein a parameter is historical yield data.

5. A system, as set forth in claim 1, wherein a parameter is soil data.

6. A system, as set forth in claim 1, wherein a parameter is historical prescription application data.

7. A system, as set forth in claim 1, wherein a parameter is a terrain map having characteristics of the field.

8. A system, as set forth in claim 7, wherein a characteristic of the field is a contour of the field.

9. A system, as set forth in claim 7, wherein a characteristic of the field is an obstacle in the field.

10. A system, as set forth in claim 7, wherein a characteristic of the field is an area of discontinuous contour of the field.

11. A system, as set forth in claim 7, wherein a characteristic of the field is an area of non-tillable terrain in the field.

12. A system, as set forth in claim 1, wherein a parameter is the location of the agricultural machine.

13. A system, as set forth in claim 1, wherein a parameter is rainfall data.

14. A system, as set forth in claim 1, further including a work implement connected to the agricultural machine.

15. A system, as set forth in claim 14, wherein a parameter is a characteristic of the work implement.

16. A system, as set forth in claim 15, wherein the machine controller is further adapted to control the work implement to perform the desired work operation at each respective node.

17. A system, as set forth in claim 16, wherein the machine controller is adapted to control a rate of application of the work implement.

18. A system, as set forth in claim 16, wherein the machine controller is adapted to control an elevation of the work implement.

19. A system, as set forth in claim 16, wherein the condition status associated with each node is updated in response to the agricultural machine performing the desired work operation at the node.

20. A system, as set forth in claim 19, wherein the first control system is adapted to store the condition status in at least one of a plurality of layered database maps.

21. A system, as set forth in claim 20, wherein a layered map contains historical yield data.

22. A system, as set forth in claim 20, wherein a layered map contains data defining locations of obstacles in the field.

23. A system, as set forth in claim 20, wherein a layered map contains fertilizer data.

24. A system, as set forth in claim 20, wherein a layered map contains data defining locations of the nodes in the field.

25. A system, as set forth in claim 20, wherein a layered map contains elevation data of the field.

26. A system, as set forth in claim 20, wherein a layered map contains data defining a condition of weeds in the field.

27. A system, as set forth in claim 20, wherein a layered map contains rainfall data.

28. A system, as set forth in claim 20, wherein a layered map contains irrigation data.

29. A system, as set forth in claim 16, further including a display monitor located on the agricultural machine and electrically connected to the second control system.

30. A system, as set forth in claim 29, wherein the desired work operation relative to each node is displayed on the display monitor to enable an operator of the agricultural machine to responsively control at least one of the agricultural machine and the work implement.

31. A system, as set forth in claim 16, wherein the desired work operation relative to each node is communicated to the machine controller to enable autonomous control of at least one of the agricultural machine and the work implement.

32. A system, as set forth in claim 1, further including a communications system adapted to enable communications between the first control system and the second control system.

33. A system, as set forth in claim 32, wherein the communications system is a wireless communications system.

34. A system, as set forth in claim 32, wherein the communications system is a wired communication system enabled by electrically connecting the first control system to the second control system.

35. A system, as set forth in claim 32, wherein the communications system is a data receptor connected to at least one of the first control system and the second control system, the data receptor being adapted to receive a data medium for communicating data.

36. A system, as set forth in claim 35, wherein the data medium is a removable storage medium.

37. A system, as set forth in claim 1, further including a position determining system located on the agricultural machine and electrically connected to the second control system.

38. A system, as set forth in claim 37, wherein the position determining system includes a GPS receiver.

39. A system, as set forth in claim 1, further including a display monitor electrically connected to the first control system.

40. A computer-aided farming method, including the steps of:
receiving data at a first control system, the data defining a plurality of parameters;
determining a plurality of nodes located at an agricultural field;
determining a condition status associated with each of the nodes, the condition status at each node being a function of the parameters;
receiving data defining the nodes at a second control system located on an agricultural machine;
receiving data defining the condition status at each node at the second control system;
planning a path as a function of the nodes;
determining a desired work operation relative to each node, the desired work operation being a function of the condition status at each node; and
controlling the agricultural machine to perform the desired work operation at each respective node.

41. A method, as set forth in claim 40, wherein planning a path includes the step of determining a plurality of segments, each segment connecting two nodes.

42. A method, as set forth in claim 41, wherein controlling the agricultural machine includes the step of controlling navigation of the agricultural machine to traverse the path.

43. A method, as set forth in claim 40, further including the step of controlling a work implement connected to the agricultural machine to perform the desired work operation at each respective node.

44. A method, as set forth in claim 43, wherein controlling a work implement includes the step of controlling a rate of application of the work implement.

45. A method, as set forth in claim 43, wherein controlling a work implement includes the step of controlling an elevation of the work implement.

46. A method, as set forth in claim 43, further including the step of updating the condition status associated with each node in response to the agricultural machine performing the desired work operation at the node.

47. A method, as set forth in claim 40, further including the step of storing the condition status in at least one of a plurality of layered database maps.

48. A method, as set forth in claim 40, further including the step of determining the position of the agricultural machine.

49. A method, as set forth in claim 40, further including the step of displaying the desired work operation relative to each node on a display monitor located on the agricultural machine.

50. A computer-aided farming system, comprising:
a first control system adapted to receive data defining a plurality of parameters and responsively determine a plurality of nodes located at an agricultural field, the first control system being further adapted to determine a condition status associated with each of the nodes, the condition status at each node being a function of the parameters;
a second control system located on an agricultural machine and adapted to receive data defining the nodes and the condition status at each node, the second control system being further adapted to plan a path as a function of the nodes and to determine a desired work operation relative to each node, the desired work operation being a function of the condition status at each node;
a communications system adapted to enable communications between the first control system and the second control system;
a position determining system located on the agricultural machine and electrically connected to the second control system;
a work implement connected to the agricultural machine; and
a machine controller located on the agricultural machine and adapted to control at least one of the agricultural machine and the work implement to perform the desired work operation at each respective node.

* * * * *